Oct. 26, 1965     O. VON ZELEWSKY     3,213,492
DEVICE FOR MAKING PARTS OF PLASTIC MATERIAL
BY INJECTION MOLDING
Filed Oct. 29, 1962     2 Sheets-Sheet 1

INVENTOR.
OTTOMAR VON ZELEWSKY
BY
*Walter Becker*

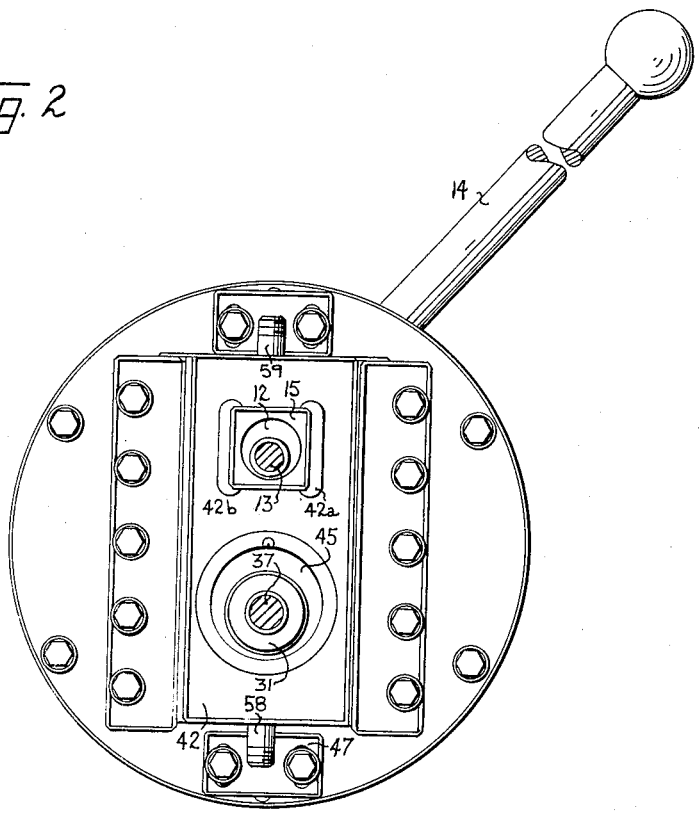

United States Patent Office 3,213,492
Patented Oct. 26, 1965

3,213,492
DEVICE FOR MAKING PARTS OF PLASTIC MATERIAL BY INJECTION MOLDING
Ottomar von Zelewsky, Neuhausen am Rheinfall, Switzerland, assignor to Georg Fischer Aktiengesellschaft, Schaffhausen, Switzerland
Filed Oct. 29, 1962, Ser. No. 233,520
Claims priority, application Switzerland, Nov. 10, 1961, 13,063/61
4 Claims. (Cl. 18—42)

The present invention concerns a device for making parts of plastic material by injection molding, especially while employing a core in the mold, which core is passed around by the injected plastic material.

According to most heretofore known methods and devices for injection molding parts of synthetic material with a core, the feed head or gating of the mold is effected at a portion of the periphery, for instance in radial direction on a sleeve. As a result thereof, the injected material fills-in and passes through the injection mold from two sides. At two front, the material flows around the core. Approximately at that side which is located opposite to the gate, said two fronts meet each other and are supposed homogeneously to fuse under the injection pressure and the prevailing temperature. Unfortunately, this is never the case in practice. Cylindrical parts, as for instance sleeves, which are gated unilaterally, radially or tangentially, will clearly show a weak spot at the joint, i.e. where the two fronts meet. This weak spot at the joint or seam may be explained by a change which takes place in a thin layer at the surface of the material during the relatively long passage from the injection opening to the point where the two fronts meet. The joining surfaces have already cooled-off somewhat and have directed the chain molecules so that no homogeneous fusing can occur.

A hard crust forms at the surface inasmuch as the material is displaced from the center whereby necessarily a score or notch will form on the inner side as well as on the outer side of the cylinder. When viewed from the outside, first a zone with poor binding forms, and a really good binding will occur only in the central portion of the wall.

In order to overcome these difficulties, it has frequently been suggested to gate cylindrical parts axially. This requires rather complicated injection molds in many instances. In other instances the axial feeding cannot be realized at all.

It is, therefore, an object of the present invention to provide a device for injection molding plastic materials, which will overcome the above mentioned drawbacks.

It is a further object of this invention to provide a device for injection molding plastic materials, which will assure that the joint of the material being molded around the core will be formed in a substantialy homogeneous manner, thereby producing a proper homogeneous fusing.

It is also an object of the present invention to provide a device for injection molding plastic materials, which at the eventual seam of the material will create a kneading movement which will mechanically tear apart the material surface so that fresh particles of the material which were located below the surface will contact each other and thereby bring about a proper fusing.

These and other objects and advantages of the invention will appear more clearly from the following specification in connection with the accompanying drawings in which:

FIG. 2 is a cross section taken along the line II—II of FIG. 1.

Figure 1:
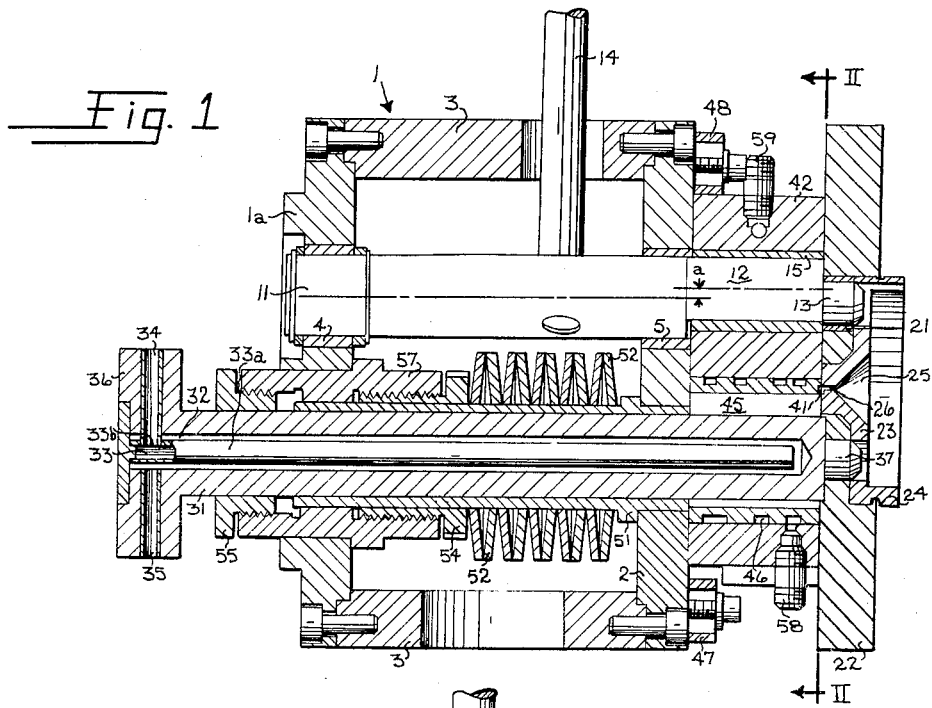
FIG. 1 illustrates a longitudinal section through a device according to the present invention with stationary core and movable injection mold.

The present invention is characterized primarily in that in contrast to heretofore known methods of the type involved, during and directly after the injection step proper, the core is displaced relative to the injection mold whereby a kneading movement is effected in the material, especially at the confluence of the material.

For the sake of completeness it may be mentioned that methods have been known heretofore according to which, for purposes of homogenizing the material or for improving the rising ability of the material being pressed, a high frequency alternating pressure is hydraulically or by vibration superimposed upon the static injection pressure. These methods, however, have not been developed for improving the joint or seam above referred to and differ fundamentally from the device according to the present invention.

The device according to the present invention is more particularly characterized in that the injection mold comprises at least one movable member adapted to vary the available hollow chamber. During the injection step, the said movable member occupies a position differing from the final position and is movable during or directly after the injection step proper into a position determining the final shape of the article being molded.

Referring now to the drawings in detail, the device shown therein comprises a stationary housing 1 which includes a central housing member 3, a rear wall 1a and a front wall 2. The rear wall and front wall 1a and 2 have bearings 4 and 5 in which an eccentric shaft 11 is rotatably journalled. The axis of the eccentric 12 is offset with regard to the eccentric of the shaft 11 by a distance $a$ which amounts to a few millimeters. The axis of stud 13 connected to the eccentric 12 and journalled in a bearing 21 is in axial alignment with the axis of shaft 11. In addition thereto, a stationary core 31 is journalled in the rear wall 1a and in the front wall 2. Core 31 is designed as a stationary hollow shaft adapted to receive cooling means. Core 31 has a bore 32 into which extends a tube 33. Tube 33 has an outer diameter which is less than the inner diameter of bore 32 so that an annular passage will be formed around the tube 33. Tube 33 is open at its end 33a and has its other end provided with an opening 33b communicating with an inlet conduit 34 adapted to be connected to a cooling fluid supply source. Similarly, the bore 32 communicates with a discharge conduit 35 for discharging a cooling fluid. Thus, the cooling fluid may be introduced through inlet conduit 34, then passes through tube 33 into the annular passage between tube 33 and core 31 and leaves this annular passage through discharge conduit 35.

The front end of core 31 has connected thereto a stud 37. A closure plate 22 is fitted upon stud 37 and bearing 21. Stationarily mounted in the closure plate 22 is the mouth 23 of a nozzle 24. This mouth 23 with its conical bore 25 serves for receiving the injection head of an injection unit not illustrated in the drawings. The fine bore 26 of the injection mouth 23 leads into the gate passage 41 of the injection mold. The injection mold 42 is vertically displaceably journalled along one plane between the front wall 2 of the housing and the closure plate 22 and is laterally guided by two guiding strips 43 and 44 as clearly shown in FIG. 2. It will be appreciated that the mold is cut out at the sides at 42a and 42b, and it is for this reason that the mold carries out only an upward and downward movement but not a lateral movement.

According to the particular example illustrated in the drawing, the work piece to be produced is a sleeve or cylinder and, accordingly, the corresponding chamber in the mold is represented by hollow chamber 45. According to the showing of FIG. 1, mold 42 occupies its uppermost position so that the mold chamber 45 is eccentric with regard to the core so that its upper portion is wider than its lower portion. This position represents the starting position of the mold. The molding material is injected into chamber 45 through bore 26 and the gating passage 41. During this operation, an annular or sleeve-shaped piston 51 is displaced axially toward the rear against the thrust of a pressure spring 52. Subsequently, by turning the eccentric shaft 11, for instance by means of a lever 14, through the intervention of the eccentric 12 and the eccentric sleeve 15 (FIG. 2), the entire mold 42 is displaced downwardly. The results of this displacement of mold 42 are as follows:

(a) The gating opening 41 is separated from bore 26 of the injection mouth 23 and is closed.

(b) The injection material in the mold is kneaded, thoroughly worked and eccentrically displaced so that at the confluence an additional material displacement and material pressing will occur.

Surface skins of transformed or oxidized material which have formed during the injection step will be torn apart and intermixed. The material will once more be kneaded under pressure and stirred similarly to the material in a homogenizing machine. This operation may be repeated as often as desired.

In the injection mouth 23, the injection unit may already be withdrawn prior to the completion of the molding operation. Thus, by means of one and the same injection unit, one or more injection molds may be filled. The post-pressure required during the cooling-off period will be maintained by the annular or sleeve-shaped piston 51 in cooperation with the pressure spring 52. This post-pressure may be controlled by means of a threaded sleeve 54 which threadedly engages a correspondingly threaded sleeve member 57 fixedly connected to the rear wall 1a of the housing 1. Sleeve 57 is furthermore threadedly engaged by a second threaded sleeve 55 which, similar to sleeve 54, is adjustable in sleeve 57 and serves as an abutment. Whereas the threaded sleeve 54 serves as an abutment for spring 52, threaded sleeve 55 serves as an abutment for the annular or sleeve-shaped piston 51 which is slidable in sleeve 57 and upon core 31.

Due to the shrinkage of the injection material during the cooling-off period, the pressure spring 52 will move piston 51 toward the right with regard to FIG. 1 and eventually into the position shown in FIG. 1.

The arrangement according to the present invention furthermore comprises means for cooling the injection mold, for instance through passages 46. These passages 46 may be connected to a cooling fluid source through a connection 58 and may be connected to a discharge 59.

As will be evident from the above, one of the great advantages of the present invention is the kneading of the material in the mold and preferably at the confluence or joint where the material passing around the core will meet. This kneading process will at said confluence or seam bring about a homogeneous fusing and bonding of high strength.

The provision of a post-pressure piston and the valve-like closing of the injection opening makes it possible to use one and the same injection unit in a cycle method alternately for a plurality of injection molds. In connection with practicing the method in this manner, it will be advantageous to arrange the various injection molds along a circle around a rotatable injection unit thereby considerably increasing the production.

It is, of course, to be understood that the present invention is, by no means, limited to the particular construction shown in the drawings but also comprises any modifications within the scope of the appended claims. Thus, for instance, the manually operable lever 14 of the eccentric shaft 11 may be replaced by a mechanical or automatic mechanism. Instead of the dish springs 52, also other pressure springs or even a hydraulic pressure unit may be provided. Furthermore, the movement of the mold with one degree of freedom only may also be replaced by a movement with more than one degree of freedom, for instance by omitting the eccentric-slide sleeve 15 and the two guiding strips 43 and 44. It is, of course, evident that the end positions of the mold must be properly ascertained and also the central position thereof.

Figure 3:
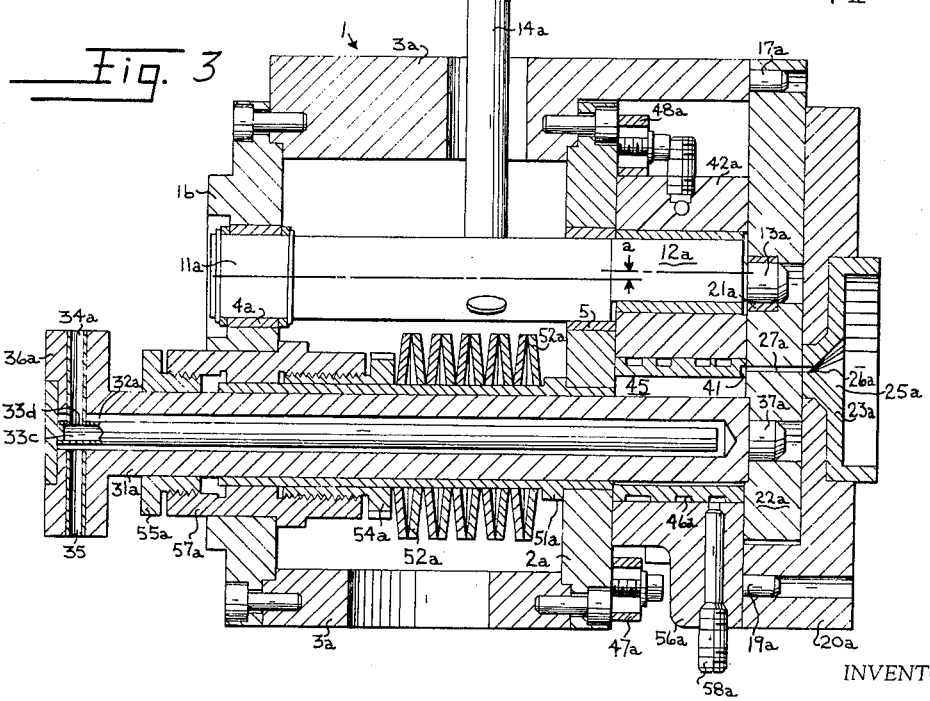
FIG. 3 is a longitudinal section of an alternative device with a stationary mold and a movable core.

Instead of a stationary core 31 and a movable mold 42 it is, of course, also possible to use a kinematically inverted arrangement which means a stationary mold and a movable core according to FIG. 3. FIG. 3 illustrates a longitudinal section of a correspondingly device with a stationary injection mold 42a and a movable core 31a. All the parts 1b, 2a, 3a, 4a, 5a, 11a, 12a, 13a, 14a, 21a, 22a, 31a, 32a, 33c, 33d, 34a, 35a, 36a, 47a, 48a, 51a, 52a, 54a, 55a, 57a are the same as in FIG. 1 but they are movable against the parts of the now stationary parts of the mold 42a and the sprue plate 20a. The closure plate 22a with the bore 16a are fixed together with the core 31a and the movable parts mentioned above with the aid of connecting pins 17a. The stationary parts of this device are the injection mold 42a, the gating opening 41a, the cooling passages 46a, the mounting flange 56a, the connections 58a and 59a, several connecting pins 19a, the sprue plate 20a, the injecting mouth 23a, its conical bore 25a and its cylindrical bore 26a.

What I claim is:

1. In a device for injection molding work pieces: supporting means, shaft means rotatably journalled in said supporting means and having an eccentric, a mold comprising two stationary parallel side wall portions spaced from each other and an intermediate portion interposed between said side wall portions and confining therewith a closed mold chamber, said eccentric being disposed between said side wall portions and said inttermediate portion being rotatably journalled on said eccentric and being slidable on said side wall portions, means on said side wall portions guiding said intermediate portion, stationarily arranged core means extending into said mold chamber, means operatively connected to said shaft means for rotating the same, and means for injecting moldable material into said chamber.

2. In a device for injection molding work pieces: supporting means, shaft means rotatably journalled in said supporting means and having an eccentric, a mold comprising two stationary parallel side wall portions spaced from each other and an intermediate portion interposed between said side wall portions and confining there with a closed mold chamber, said eccentric being disposed between said side wall portions and said intermediate portion being rotatably journalled on said eccentric and being slidable on said side wall portions, means on said side wall portions guiding said intermediate portion, means operatively connected to said shaft means for rotating the same, one of said side wall portions having a bore therethrough, stationarily arranged core means extending through said bore into said mold with the outer periphery of said core in radially spaced relationship to said one side wall portion, annular piston means extending into said bore in slidable engagement with said one side wall portion and the periphery of said core and being movable relative thereto, spring means yieldably engaging said annular piston means and continuously urging the same to move in the direction toward said mold chamber so as to apply pressure on material in said chamber, and means for injecting moldable material into said chamber.

3. In a device for injection molding work pieces: supporting means, shaft means rotatably journalled in said supporting means and having an eccentric, a mold comprising two stationary parallel side wall portions spaced from each other and an intermediate portion interposed between said side wall portions and confining therewith a closed mold chamber, said eccentric being disposed between said side wall portions and said intermediate portion being rotatably journalled on said eccentric and being slidable on said side wall portions, means on said side wall portions guiding said intermediate portion, means operatively connected to said shaft means for rotating the same, one of said side wall portions having a bore therethrough, stationarily arranged core means extending through said bore into said mold with the outer periphery of said core in radially spaced relationship to said one side wall portion, annular piston means extending into said bore in slidable engagement with said one side wall portion and the periphery of said core and being movable relative thereto, spring means yieldably engaging said annular piston means and continuously urging the same to move in the direction toward said mold chamber so as to apply pressure on material in said chamber, inlet means for admitting plastic material into said chamber in one of said side wall portions, said inlet means being arranged laterally of said chamber and communicating with said chamber in only one laterally adjusted position of said intermediate portion of said mold into which said intermediate portion is moved by rotation of said shaft means.

4. In a device for injection molding workpieces; a support, a mold carried by said support and comprising spaced parallel side walls and an intermediate portion disposed between said side walls, said intermediate portion having a bore therethrough forming with said walls a closed chamber for receiving molding material, a core member in said supporting extending into said chamber, shaft means rotatably carried by said support and having eccentric means thereon operatively connected to at least one of said core and intermediate portion, means for injecting molding material into said chamber, and means for rotating said shaft means to move said intermediate portion and said core relative to each other thereby to cause kneading of molding material in said chamber.

References Cited by the Examiner

UNITED STATES PATENTS

| | | | |
|---|---|---|---|
| 996,264 | 6/11 | Levy. | |
| 1,674,387 | 6/28 | Campbell | 18—6 XR |
| 2,570,284 | 10/51 | Stott et al. | 18—30 |
| 2,696,023 | 12/54 | Stott | 264—328 |
| 2,781,547 | 2/57 | Moxness | 18—30 XR |
| 2,828,509 | 4/58 | Smucker et al. | 18—30 |
| 2,956,309 | 10/60 | Herbst | 264—328 |
| 3,029,472 | 4/62 | Fischer | 18—30 |

J. SPENCER OVERHOLSER, *Primary Examiner.*

ALEXANDER H. BRODMERKEL, MICHAEL V. BRINDISI, WILLIAM J. STEPHENSON, *Examiners.*